March 27, 1934.  R. K. LEE  1,952,718
SPRING SUSPENSION
Filed Sept. 26, 1929
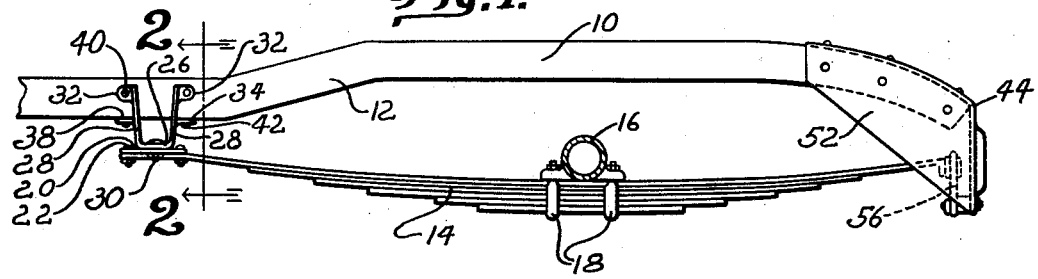
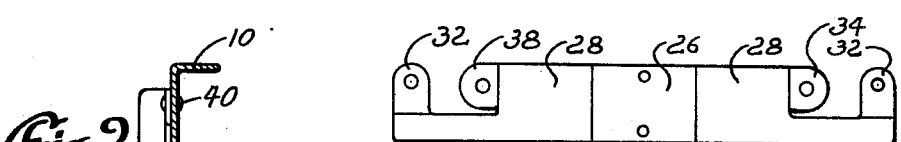
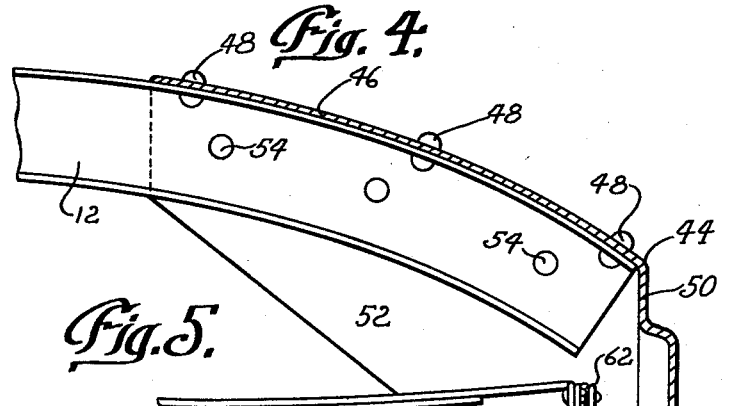
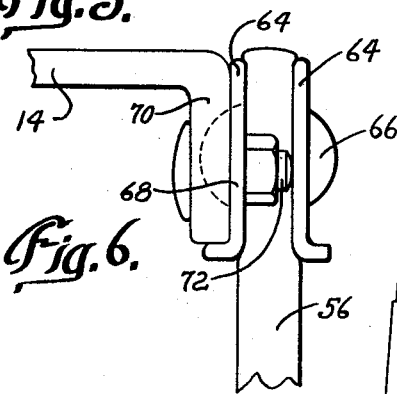
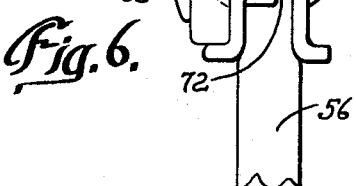
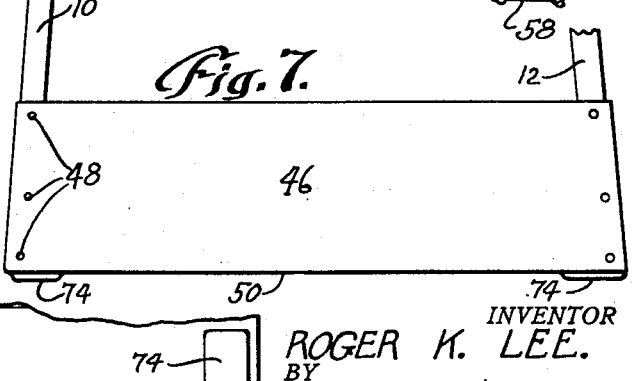
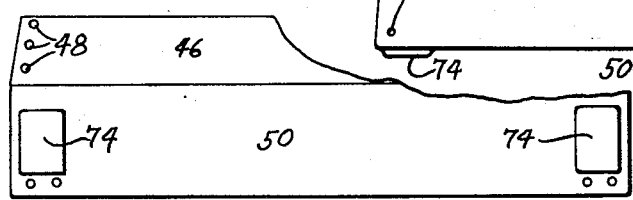
INVENTOR
ROGER K. LEE.
BY
ATTORNEY Patented Mar. 27, 1934

1,952,718

UNITED STATES PATENT OFFICE 1,952,718

SPRING SUSPENSION

Roger K. Lee, Detroit, Mich., assignor to Chrysler Corporation, Detroit, Mich., a corporation of Delaware Application September 26, 1929, Serial No. 395,232

5 Claims. (Cl. 280—106.5)

This invention relates to a spring suspension and more particularly to a spring suspension for a motor vehicle.

An important object of the invention is to provide an inexpensive connection between the chassis frame of a motor vehicle and the axle springs. More specifically stated, the invention consists in a single stamping, which serves as a rear cross member and as a means for supporting the spring ends.

Another object of the invention is to provide an improved cross member for a vehicle chassis frame which embraces the ends of the chassis frame members and projects downwardly, covering one end of the vehicle springs.

Other objects and advantages of the invention will more fully appear from the following description taken in connection with the accompanying drawing, in which:

Fig. 1 is a side elevation of a portion of a vehicle chassis illustrating one adaptation of my invention.

Fig. 2 is a sectional view taken on line 2—2 of Fig. 1 showing one form of a connecting means between the forward end of a spring and the chassis frame.

Fig. 3 is a bottom plan view of Fig. 2, as viewed in a direction indicated by the arrows 3—3 of Fig. 2.

Fig. 4 is a plan view of a stamping, showing in developed form the bracket for securing the forward end of the spring to the chassis frame.

Fig. 5 is a sectional view illustrating the connection between the rear end of the spring and the chassis frame.

Fig. 6 is an enlarged fragmentary view illustrating the connection of a flexible member to the end of a spring.

Fig. 7 is a plan view of the rear end of the chassis frame showing my improved cross member.

Fig. 8 is an end view of the chassis frame shown in Fig. 1.

Referring now to the drawing wherein I have illustrated a preferred embodiment of my invention, the reference numeral 10 designates the chassis frame of a motor vehicle comprising a pair of longitudinal frame members 12 extending generally in a parallel direction. A pair of springs 14 are secured to an axle 16 by U bolts 18 and in this form of my invention the springs 14 extend generally in a parallel relation with the frame members 12, directly beneath the frame members. The spring 14 comprises a plurality of leaves of different lengths, the upper leaf of which is secured by suitable connections to the frame members 12.

At the forward end of the spring 14 I have secured a flat flexible link 20. The longitudinal ends of the link are connected to the upper spring leaf, such as by bolts 22. The link is also provided with lateral projections 24 extending beyond the marginal edges of the spring leaf, forming a means for attaching the link 20 to a bracket which is secured to the frame members 12. The bracket comprises a U shaped stamping having a base portion 26 and a pair of upwardly extending flanges 28. The lateral projections 24 of the link are secured to the base portion 26 of the U shaped member, such as by bolts 30. The upwardly extending flanges 28 are each provided with lateral flanges 32 at their upper ends and with lateral flanges 34 intermediate their ends. The flanges 32 extend generally in a vertical plane, to be secured to the side channel frame 12, as at 40. The flanges 38 extend generally in a horizontal plane and are adapted to be secured to the under side of the channel members 12, as at 42, by bolts or rivets. It will be understood that the flexible link 20 is under compression between the end of the spring leaf and the base portion 26 of the U shaped bracket.

At the rear end of the chassis frame I have provided a rear cross member 44, having an upper portion 46, extending generally in a horizontal plane, adapted to be secured to the side frame members 12, and a rear portion 50 extending downwardly from the portion 46 embracing the ends of the channel frame 12. An end flange 52 is integrally connected to the ends of the portions 46 and 50 and is adapted to be received on the outer surface of the channel frame members 12. Rivets 54 extend through the sides of the channel frame members 12 and the flanges 52 to further secure the rear cross member 44 on the frame members 12. The rear cross member 44 secures the ends of the frame members 12 in spaced relation and embraces the outer ends of the frame members with the lower edge of the cross member extending below the lower portion of the side frame members.

Adjacent the opposite ends of the rear cross member I have secured a flexible link 56 extending in a vertical plane and spaced from the downwardly extending portion 50 by a spacer 58. One end of the link 56 is secured to the lower edge of the rear cross member 44, as at 60, and the opposite end of the link 56 is secured to the rear end of the upper leaf of the spring 14, as at 62. Referring to Fig. 6, metallic plates 64 are positioned at the opposite sides of the upper end of the link 56. The upper end of the link 56 is secured, under compression, between the plates 64 by rivets 66. One of the plates 64 is provided with laterally extending projections 68, which are secured to a turned down end portion 70 of the spring 14 by bolts 72. The connecting means at 60 for the lower end of the link is substantially the same construction.

The rear end of the spring 14 is positioned above the lower edge of the rear cross member 44 and below the lower edge of the side frame members 12. The link 56 is under tension, and the flexible link 20, at the forward end of the spring, is under compression, being positioned between the upper surface of the spring 14 and the lower surface of the base portion 26. A recess 74 is provided in the downwardly extending portion 50 of the rear cross member 44 to permit horizontal movement of the rear end of the spring 14.

It will be understood that various changes, including the size, shape and arrangement of parts, may be made without departing from the spirit of my invention, and it is not my intention to limit its scope other than by the terms of the appended claims.

What I claim is:

1. A chassis frame construction having a pair of longitudinal frame members, a rear cross member connecting said longitudinal frame members, axle supporting springs below said longitudinal frame members, and means for securing the spring ends to said frame, said rear cross member having its lower edge below the spring ends and their connection to the frame.

2. A chassis frame construction having a pair of longitudinal frame members, a transverse frame member having a portion extending horizontally over the upper surfaces of said longitudinal frame members and a portion extending vertically over the ends of said longitudinal frame members, and axle supporting spring ends secured to the vertically extending portion of said transverse spring member.

3. A chassis frame construction having a pair of longitudinal frame members, a transverse frame member having a portion extending horizontally over the upper surfaces of said longitudinal frame members and a portion extending vertically over the ends of said longitudinal frame members, and axle supporting spring ends secured to said transverse frame member below said longitudinal frame members and above the lower edge of said transverse frame member.

4. A chassis frame construction having a pair of longitudinal frame members, a transverse frame member having an upper portion extending over and conforming generally to the contour of the upper surface of the longitudinal frame members, an integral portion extending vertically over the ends of said longitudinal frame members, and integral end portions over the outer surfaces of said longitudinal frame members.

5. A rear cross member having a horizontal portion, an integral vertical portion, and integral end portions connecting the ends of the horizontal and vertical portions, said vertical portion being provided with a depressed portion adjacent each end portion.

ROGER K. LEE.